(12) United States Patent
Malkin et al.

(10) Patent No.: US 11,956,204 B1
(45) Date of Patent: Apr. 9, 2024

(54) IPv4-IN-IPv6 RELAYING SYSTEMS AND METHODS TO PRESERVE IPv4 PUBLIC ADDRESSES

(71) Applicant: Plume Design, Inc., Palo Alto, CA (US)

(72) Inventors: Yoseph Malkin, San Jose, CA (US); Paul White, Burlingame, CA (US); Matej Zevnik, Ljubljana (SI)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 18/145,929

(22) Filed: Dec. 23, 2022

(51) Int. Cl.
| | | |
|---|---|---|
| G06F 15/16 | (2006.01) | |
| H04L 12/46 | (2006.01) | |
| H04L 61/251 | (2022.01) | |
| H04L 61/2592 | (2022.01) | |
| H04L 69/22 | (2022.01) | |

(52) U.S. Cl.
CPC ...... *H04L 61/2592* (2013.01); *H04L 12/4633* (2013.01); *H04L 61/251* (2013.01); *H04L 69/22* (2013.01)

(58) Field of Classification Search
CPC ............. H04L 61/2592; H04L 12/4633; H04L 61/251; H04L 69/22
USPC ........................................................ 709/249
See application file for complete search history.

(56) References Cited

U.S. PATENT DOCUMENTS

| | | | | |
|---|---|---|---|---|
| 5,748,617 A | * | 5/1998 | McLain, Jr. ........ | H04M 3/2254 703/23 |
| 5,809,286 A | * | 9/1998 | McLain, Jr. ........ | H04M 3/2254 703/23 |
| 5,867,689 A | * | 2/1999 | McLain, Jr. ........ | H04M 3/2254 703/23 |
| 6,006,259 A | * | 12/1999 | Adelman ................ | H04L 61/10 709/223 |
| 6,078,957 A | * | 6/2000 | Adelman ................ | H04L 61/00 709/224 |
| 6,097,804 A | * | 8/2000 | Gilbert ................. | H04Q 3/0029 379/900 |
| 6,233,617 B1 | * | 5/2001 | Rothwein ............. | H04L 63/083 709/227 |
| 6,295,551 B1 | * | 9/2001 | Roberts ............... | H04L 12/6418 709/205 |
| 6,415,329 B1 | * | 7/2002 | Gelman ................ | H04L 69/163 709/245 |
| 6,779,035 B1 | * | 8/2004 | Gbadegesin .......... | H04L 61/255 709/227 |
| 6,940,835 B2 | * | 9/2005 | Reza ....................... | H04W 8/26 455/436 |

(Continued)

*Primary Examiner* — Alicia Baturay
(74) *Attorney, Agent, or Firm* — Nicholas Martin; Greenberg Traurig, LLP

(57) ABSTRACT

A method, implemented in a router in a Communication Service Provider (CSP) network, includes connecting to a device via at least two connections where a first connection includes a first Wide Area Network (WAN) interface and a second connection includes a second WAN interface; receiving an encapsulated packet from one of the at least two connections where the encapsulated packet is destined for an Internet Protocol version 4 (IPv4) address on the Internet; and creating an IPv4 packet from the encapsulated packet by de-encapsulating the encapsulated packet and including an IPv4 public address in an IPv4 packet, wherein the IPv4 public address is associated with the router.

20 Claims, 9 Drawing Sheets

(56) References Cited

U.S. PATENT DOCUMENTS

| | | | | |
|---|---|---|---|---|
| 6,954,790 B2* | 10/2005 | Forslow | ............. | H04L 63/0227 709/227 |
| 7,065,547 B2* | 6/2006 | Persels | ................. | H04L 69/08 709/200 |
| 7,120,136 B2* | 10/2006 | Upp | .................. | H04W 8/26 455/433 |
| 7,145,902 B2* | 12/2006 | Schindler | ............. | H04L 41/12 370/395.2 |
| 7,194,535 B2* | 3/2007 | Hannel | ................ | H04L 69/163 709/224 |
| 7,305,474 B2* | 12/2007 | Giaffreda | ............. | H04L 67/146 709/227 |
| 7,430,555 B2* | 9/2008 | Sealand | ................ | G06Q 50/16 707/999.102 |
| 7,707,240 B2* | 4/2010 | Marascio | ............ | H04L 65/1053 709/202 |
| 7,752,658 B2* | 7/2010 | Jirka | ................... | H04L 63/10 709/225 |
| 7,778,273 B2* | 8/2010 | Luo | ................... | H04L 45/02 370/312 |
| 7,797,437 B2* | 9/2010 | Hovmark | ............ | H04L 69/162 455/442 |
| 7,853,781 B2* | 12/2010 | Freed | ................. | H04L 67/1008 713/153 |
| 7,895,322 B2* | 2/2011 | Murakami | ............ | H04L 67/14 709/224 |
| 7,990,861 B1* | 8/2011 | Jin | .................... | H04L 1/1832 370/230.1 |
| 8,005,989 B2* | 8/2011 | Corl, Jr. | ............... | H04L 45/00 709/240 |
| 8,028,071 B1* | 9/2011 | Mahalingam | ........... | H04L 69/32 718/1 |
| 8,127,027 B2* | 2/2012 | Niiya | ................. | H04L 65/1069 709/227 |
| 8,369,254 B2* | 2/2013 | Sood | .................. | H04L 12/66 370/395.31 |
| 8,417,828 B2* | 4/2013 | Ma | ..................... | H04L 65/80 709/231 |
| 8,510,549 B2* | 8/2013 | Rossi | ................. | H04L 63/166 713/169 |
| 8,645,568 B2* | 2/2014 | Patterson | ............. | H04L 45/033 709/240 |
| 8,892,745 B2* | 11/2014 | Akhter | ................ | H04L 67/1001 709/227 |
| 8,897,737 B2* | 11/2014 | Hahn | .................. | G06Q 30/0267 463/40 |
| 8,929,242 B2* | 1/2015 | Anthony, Jr. | .......... | H04W 40/36 370/252 |
| 8,929,292 B2* | 1/2015 | Anthony, Jr. | ........ | H04W 36/023 370/252 |
| 8,964,562 B2* | 2/2015 | Kakadia | ............... | H04W 28/12 370/230.1 |
| 9,037,713 B2* | 5/2015 | Larson | ................ | H04L 63/0428 709/227 |
| 9,154,468 B2* | 10/2015 | du Toit | ................ | H04L 63/168 |
| 9,282,109 B1* | 3/2016 | Aziz | .................... | H04L 63/14 |
| 9,413,681 B2* | 8/2016 | Chen | .................. | H04L 12/4633 |
| 9,641,559 B2* | 5/2017 | Maistri | ................. | H04N 7/147 |
| 9,704,172 B2* | 7/2017 | Murray | ................ | G06F 3/0482 |
| 9,736,732 B2* | 8/2017 | Rao | .................... | H04W 52/0264 |
| 9,877,264 B2* | 1/2018 | Lim | ..................... | H04L 67/55 |
| 10,051,455 B2 | 8/2018 | Jeng et al. | | |
| 10,084,530 B2* | 9/2018 | Yabo | .................. | H04B 7/18513 |
| 10,110,388 B2* | 10/2018 | Lee | ..................... | H04L 67/145 |
| 10,110,657 B2* | 10/2018 | Mitic | ................... | H04L 65/611 |
| 10,116,677 B2* | 10/2018 | Faulkner | .............. | H04L 67/146 |
| 10,129,785 B2* | 11/2018 | Lee | ................... | H04W 28/0268 |
| 10,176,288 B1 | 1/2019 | Carlson et al. | | |
| 10,178,578 B1 | 1/2019 | McFarland et al. | | |
| 10,299,405 B2 | 5/2019 | Chang et al. | | |
| 10,420,155 B2 | 9/2019 | Hu et al. | | |
| 10,431,868 B2 | 10/2019 | Samardzija et al. | | |
| 10,616,379 B2* | 4/2020 | Pithawala | ............. | H04L 69/161 |
| 10,652,340 B2* | 5/2020 | Yang | .................. | H04L 67/141 |
| 10,732,917 B2* | 8/2020 | Spencer | ............... | H04L 65/4015 |
| 10,777,877 B2 | 9/2020 | Su et al. | | |
| 10,986,164 B2* | 4/2021 | Binder | ................... | H04L 65/60 |
| 10,986,165 B2* | 4/2021 | Binder | ................... | H04L 65/60 |
| 11,234,166 B2 | 1/2022 | McFarland et al. | | |
| 11,284,351 B2* | 3/2022 | Kim | ...................... | H04L 69/163 |
| 11,496,902 B2 | 11/2022 | Hotchkiss et al. | | |
| 11,831,703 B2* | 11/2023 | Gonçalo Nuno Chendo | ............. | H04L 67/02 |
| 11,893,064 B2* | 2/2024 | Tiwary | ................. | G06F 16/906 |
| 2001/0037464 A1* | 11/2001 | Persels | ................... | H04L 69/08 726/5 |
| 2002/0069278 A1* | 6/2002 | Forslow | .............. | H04L 63/0263 709/225 |
| 2002/0085549 A1* | 7/2002 | Reza | ..................... | H04W 40/36 370/352 |
| 2002/0112036 A1* | 8/2002 | Bohannon | ........... | H04L 67/1021 709/220 |
| 2002/0120760 A1* | 8/2002 | Kimchi | ............... | H04L 65/1069 709/227 |
| 2002/0194140 A1* | 12/2002 | Makuck | ............. | G06Q 20/1235 705/67 |
| 2003/0088664 A1* | 5/2003 | Hannel | ..................... | H04L 9/40 709/224 |
| 2003/0191781 A1* | 10/2003 | Civanlar | ................. | H04L 61/45 |
| 2004/0024610 A1* | 2/2004 | Fradkov | ................. | G06Q 30/04 719/328 |
| 2004/0153549 A1* | 8/2004 | Naito | ................... | H04L 47/10 709/228 |
| 2004/0170125 A1* | 9/2004 | O'Neill | ................. | H04L 12/185 370/230 |
| 2004/0202128 A1* | 10/2004 | Hovmark | .......... | H04W 36/0005 709/230 |
| 2004/0210663 A1* | 10/2004 | Phillips | ............... | H04L 69/163 709/230 |
| 2004/0243712 A1* | 12/2004 | Sakai | ...................... | H04L 41/00 709/227 |
| 2005/0015511 A1* | 1/2005 | Izmailov | ................ | H04L 12/18 709/238 |
| 2005/0154774 A1* | 7/2005 | Giaffreda | ............. | H04L 67/148 709/200 |
| 2005/0237962 A1* | 10/2005 | Upp | ........................ | H04W 8/26 370/313 |
| 2005/0254440 A1* | 11/2005 | Sorrell | ................ | H04L 65/1101 348/14.08 |
| 2006/0056393 A1* | 3/2006 | Sarmiento | ........... | H04M 7/0036 370/352 |
| 2006/0167983 A1* | 7/2006 | Webb | ...................... | H04L 63/20 709/203 |
| 2006/0190576 A1* | 8/2006 | Lee | ........................ | G06Q 30/02 709/225 |
| 2006/0206352 A1* | 9/2006 | Pulianda | .............. | G06Q 10/103 705/319 |
| 2006/0262915 A1* | 11/2006 | Marascio | ............ | H04L 65/1063 379/201.01 |
| 2006/0291455 A1* | 12/2006 | Katz | ...................... | H04L 67/14 370/328 |
| 2007/0091875 A1* | 4/2007 | Rahman | ................. | H04L 45/50 709/227 |
| 2007/0171852 A1* | 7/2007 | George | ................ | H04W 88/06 370/328 |
| 2007/0180088 A1* | 8/2007 | Zhao | ..................... | H04L 67/289 709/223 |
| 2008/0263170 A1* | 10/2008 | Caron | .................. | H04W 76/12 709/227 |
| 2008/0281966 A1* | 11/2008 | Jennings, III | ....... | H04L 63/0428 709/227 |
| 2008/0304486 A1* | 12/2008 | Graessley | ............. | H04L 69/161 370/392 |
| 2009/0003319 A1* | 1/2009 | Sood | ..................... | H04L 12/66 370/352 |
| 2009/0129570 A1* | 5/2009 | Binder | .................... | H04L 12/66 379/93.17 |

(56) References Cited

U.S. PATENT DOCUMENTS

| | | | |
|---|---|---|---|
| 2009/0132679 A1* | 5/2009 | Binder | H04L 65/60 709/217 |
| 2009/0147934 A1* | 6/2009 | Binder | H04L 67/02 379/93.17 |
| 2009/0160831 A1* | 6/2009 | Binder | H04L 12/66 709/219 |
| 2009/0174693 A1* | 7/2009 | Binder | H04L 67/568 709/219 |
| 2009/0182840 A1* | 7/2009 | Binder | H04L 67/10 709/217 |
| 2009/0182896 A1* | 7/2009 | Patterson | H04L 45/033 709/241 |
| 2009/0198795 A1* | 8/2009 | Binder | H04L 12/66 709/219 |
| 2009/0201847 A1* | 8/2009 | Yabo | H04L 65/1104 370/317 |
| 2009/0274092 A1* | 11/2009 | Chen | H04L 47/824 370/328 |
| 2009/0314615 A1* | 12/2009 | Christensen | H01H 3/26 200/17 R |
| 2010/0040219 A1* | 2/2010 | Jeong | H04M 3/42297 379/221.13 |
| 2011/0013758 A1* | 1/2011 | Binder | H04L 67/02 379/93.17 |
| 2011/0013759 A1* | 1/2011 | Binder | H04L 12/66 370/352 |
| 2011/0016505 A1* | 1/2011 | Binder | H04L 67/02 725/131 |
| 2011/0191414 A1* | 8/2011 | Ma | H04L 67/14 709/203 |
| 2013/0229976 A1* | 9/2013 | Srinivasan | H04W 88/06 370/315 |
| 2013/0258945 A1* | 10/2013 | Tomita | H04W 76/25 370/328 |
| 2013/0262587 A1* | 10/2013 | Munger | H04L 63/1458 709/204 |
| 2014/0098680 A1* | 4/2014 | Anthony, Jr. | H04W 40/36 370/252 |
| 2014/0098687 A1* | 4/2014 | Anthony, Jr. | H04W 36/0235 370/252 |
| 2014/0185452 A1* | 7/2014 | Kakadia | H04W 28/0231 370/236 |
| 2014/0195797 A1* | 7/2014 | du Toit | H04L 63/168 713/152 |
| 2014/0207960 A1* | 7/2014 | Lim | H04L 67/02 709/227 |
| 2014/0226572 A1 | 8/2014 | Thota et al. | |
| 2014/0254360 A1* | 9/2014 | Lee | H04L 65/1016 370/230 |
| 2014/0348059 A1* | 11/2014 | Yabo | H04L 65/80 370/317 |
| 2015/0201086 A1* | 7/2015 | Abi | H04M 1/2535 370/352 |
| 2015/0326455 A1* | 11/2015 | Hui | H04L 43/045 715/736 |
| 2016/0006817 A1* | 1/2016 | Mitic | H04L 65/65 709/232 |
| 2016/0021149 A1* | 1/2016 | Maistri | H04N 7/15 348/14.08 |
| 2016/0056968 A1* | 2/2016 | Lee | G06F 1/325 370/338 |
| 2016/0373519 A1* | 12/2016 | Binder | H04L 67/568 |
| 2017/0230390 A1* | 8/2017 | Faulkner | H04L 67/02 |
| 2017/0142680 A1 | 9/2017 | Singla et al. | |
| 2018/0091215 A1* | 3/2018 | Yang | H04W 76/10 |
| 2018/0109573 A1* | 4/2018 | Munger | H04L 45/24 |
| 2018/0139131 A1* | 5/2018 | Ignatchenko | H04L 47/32 |
| 2018/0375967 A1* | 12/2018 | Pithawala | H04L 69/161 |
| 2019/0171259 A1 | 6/2019 | McFarland et al. | |
| 2021/0037472 A1* | 2/2021 | Kim | H04L 67/125 |
| 2022/0217550 A1 | 7/2022 | Sakamoto et al. | |
| 2022/0255799 A1 | 8/2022 | Singla et al. | |
| 2023/0086156 A1* | 3/2023 | Gonçalo Nuno Chendo | H04L 67/141 709/203 |
| 2023/0171191 A1* | 6/2023 | Ignatchenko | H04L 45/745 370/392 |

\* cited by examiner

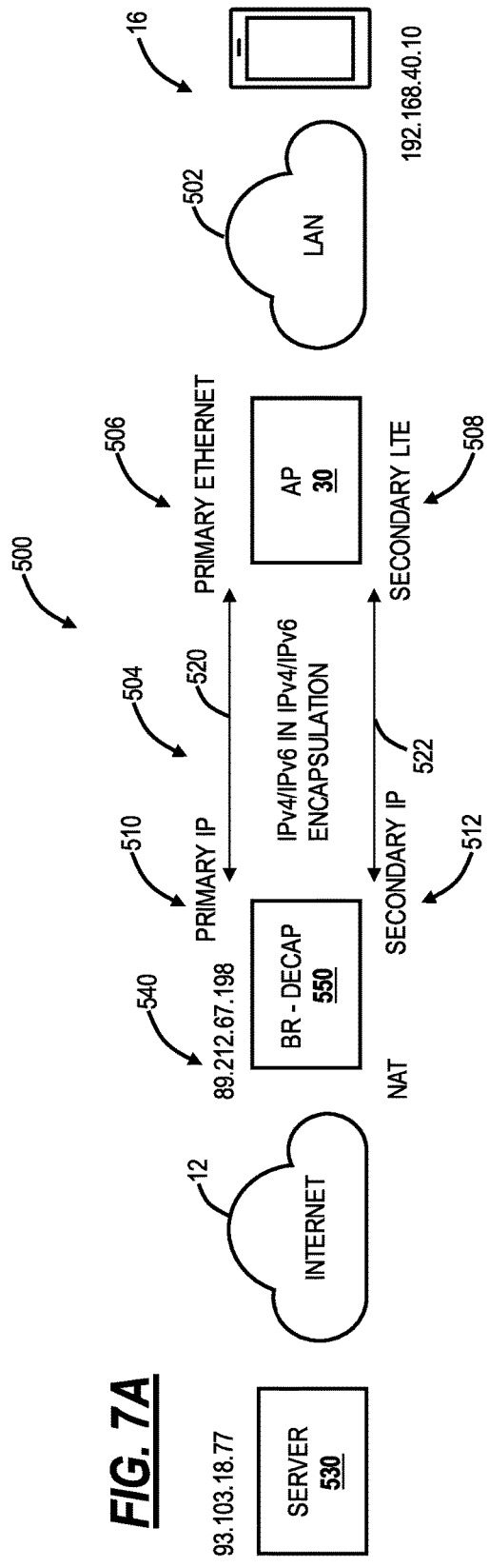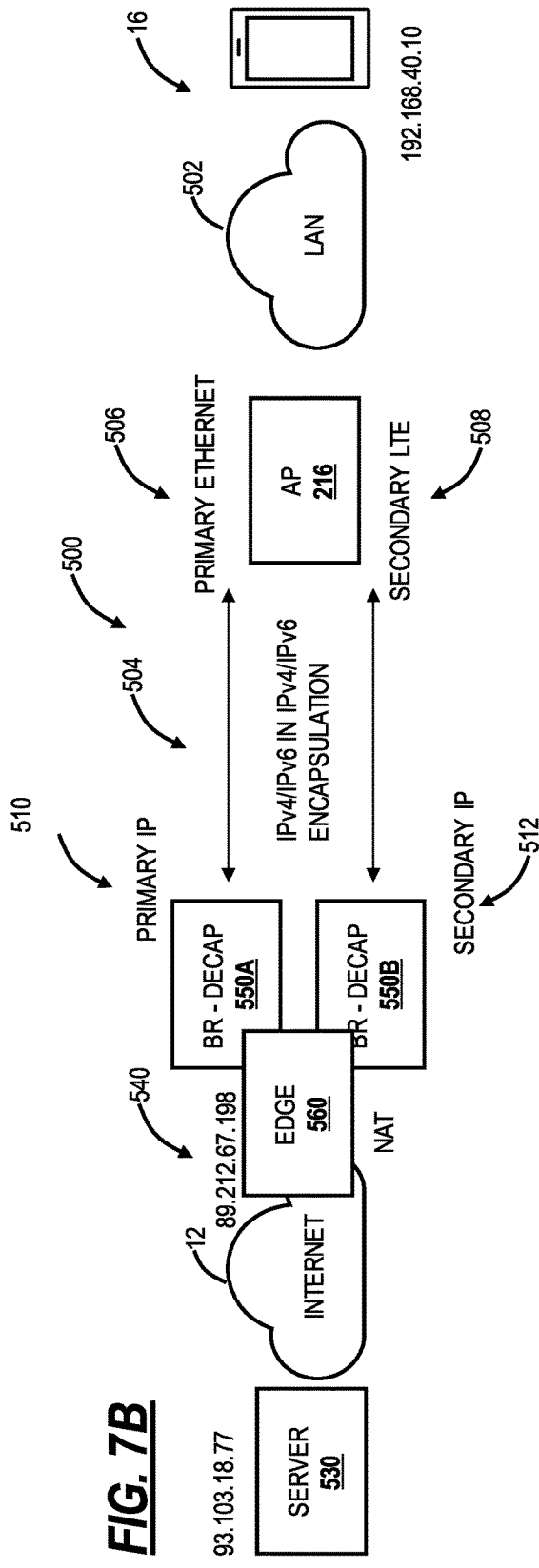

IPv4-IN-IPv6 RELAYING SYSTEMS AND METHODS TO PRESERVE IPv4 PUBLIC ADDRESSES

FIELD OF THE DISCLOSURE

The present disclosure generally relates to wireless networking systems and methods. More particularly, the present disclosure relates to systems and methods for Internet Protocol (IP) version 4 (IPv4)-in-IP version 6 (IPv6) relaying to preserve IPv4 public addresses.

BACKGROUND OF THE DISCLOSURE

Internet-connected devices, such as Wi-Fi access points, mobile phones, tablets, etc. can have multiple connections to the Internet. For example, assume a home router, the home router can have a wired broadband connection (e.g., DOCSIS, fiber, Digital Subscriber Loop (DSL), etc.) as well as a cellular backup link. In another example, a user device can include a Wi-Fi connection as well as a cellular radio for Internet connectivity. As described herein, the term "devices" is used to denote any Internet-connected device that has at least two different mechanisms to connect to the Internet (i.e., the vast majority of cases will be cellular and wired/Wi-Fi). The device maintains multiple interfaces and usually has different IP addresses on each network. That is, the device can connect to the Internet via the wired/Wi-Fi network and via a cellular/wireless network. For example, a device will have a certain IP address on the wired broadband network (say, 50.50.50.50) and another address on the other cellular network (say, 60.60.60.60).

As a result, whenever that device switches traffic from going through one network to going through the other network, all existing Transmission Control Protocol (TCP) connections to the internet will have to be restarted, since they refer to a specific IP address. The amount of time it takes an application to detect that it has lost the connection to the internet, and restart the connection, varies from very quickly to up to 15 seconds. This can be very disruptive to customers, users, etc.

BRIEF SUMMARY OF THE DISCLOSURE

The present disclosure relates to systems and methods for Internet Protocol (IP) version 4 (IPv4)-in-IP version 6 (IPv6) relaying to preserve IPv4 public addresses. In particular, the present disclosure provides a mechanism to preserve IPv4 public addresses which are scarce and to support a same IPv4 public address on multiple connections associated with a single device. For example, the single device could be a home router, home gateway, Access Point (AP), mobile device, or any Internet-enabled device configured to operate over two different networks (e.g., wired, Wi-Fi, wireless (Long Term Evolution (LTE), and the like).

In an embodiment, a method, implemented in a router in a Communication Service Provider (CSP) network, includes steps of connecting to a device via at least two connections where a first connection includes a first Wide Area Network (WAN) interface and a second connection includes a second WAN interface; receiving an encapsulated packet from one of the at least two connections where the encapsulated packet is destined for an Internet Protocol version 4 (IPv4) address on the Internet; and creating an IPv4 packet from the encapsulated packet by de-encapsulating the encapsulated packet and including an IPv4 public address in an IPv4 packet, wherein the IPv4 public address is associated with the router and is used for ingress and egress packets associated with the at least two connections. The steps can further include transmitting the IPv4 packet to a destination associated with the IPv4 address.

The router can include a first address for a port for the first WAN interface and a second address for a port for the second WAN interface. The steps can further include performing Network Address Translation between the IPv4 public address and the first address or the second address, depending on which of the first and second WAN interface is active. The first address and the second address can be Internet Protocol version 6 (IPv6) addresses. The encapsulated packet can be encapsulated using IPv4 over Internet Protocol version 6 (IPv6) tunneling. The steps can further include, responsive to a switch between the first WAN interface and the second WAN interface, receive a second encapsulated packet on a different interface from the first packet. The first encapsulated packet and the second encapsulated packet can be associated with a Transmission Control Protocol (TCP) session at the device, such that the switch does not affect the TCP session.

The device can be a modem/router at a user's home, and where the first WAN interface is a wired interface and the second WAN interface is a wireless interface. The device can be a user device, and where the first WAN interface is a Wi-Fi interface and the second WAN interface is a cellular interface. The router can be a Border Router. The Border Router can implement one of Mapping of Address and Port with Encapsulation (MAP-E) and Mapping Address and Port using Translation (MAP-T). The router can be an edge router communicatively coupled to two Border Routers, each of the two Border Routers configured to terminate one of the at least two connections.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 7A and 7B are network diagrams of a network for illustrating IPv4-in-IPv6 relaying.

DETAILED DESCRIPTION OF THE DISCLOSURE

Again, the present disclosure relates to systems and methods for Internet Protocol (IP) version 4 (IPv4)-in-IP version 6 (IPv6) relaying to preserve IPv4 public addresses. In particular, the present disclosure provides a mechanism to preserve IPv4 public addresses which are scarce and to support a same IPv4 public address on multiple connections associated with a single device. For example, the single device could be a home router, home gateway, Access Point (AP), mobile device, or any Internet-enabled device configured to operate over two different networks (e.g., wired, Wi-Fi, wireless (Long Term Evolution (LTE), and the like).

§ 1.0 WI-FI NETWORK TOPOLOGIES

Figure 1:
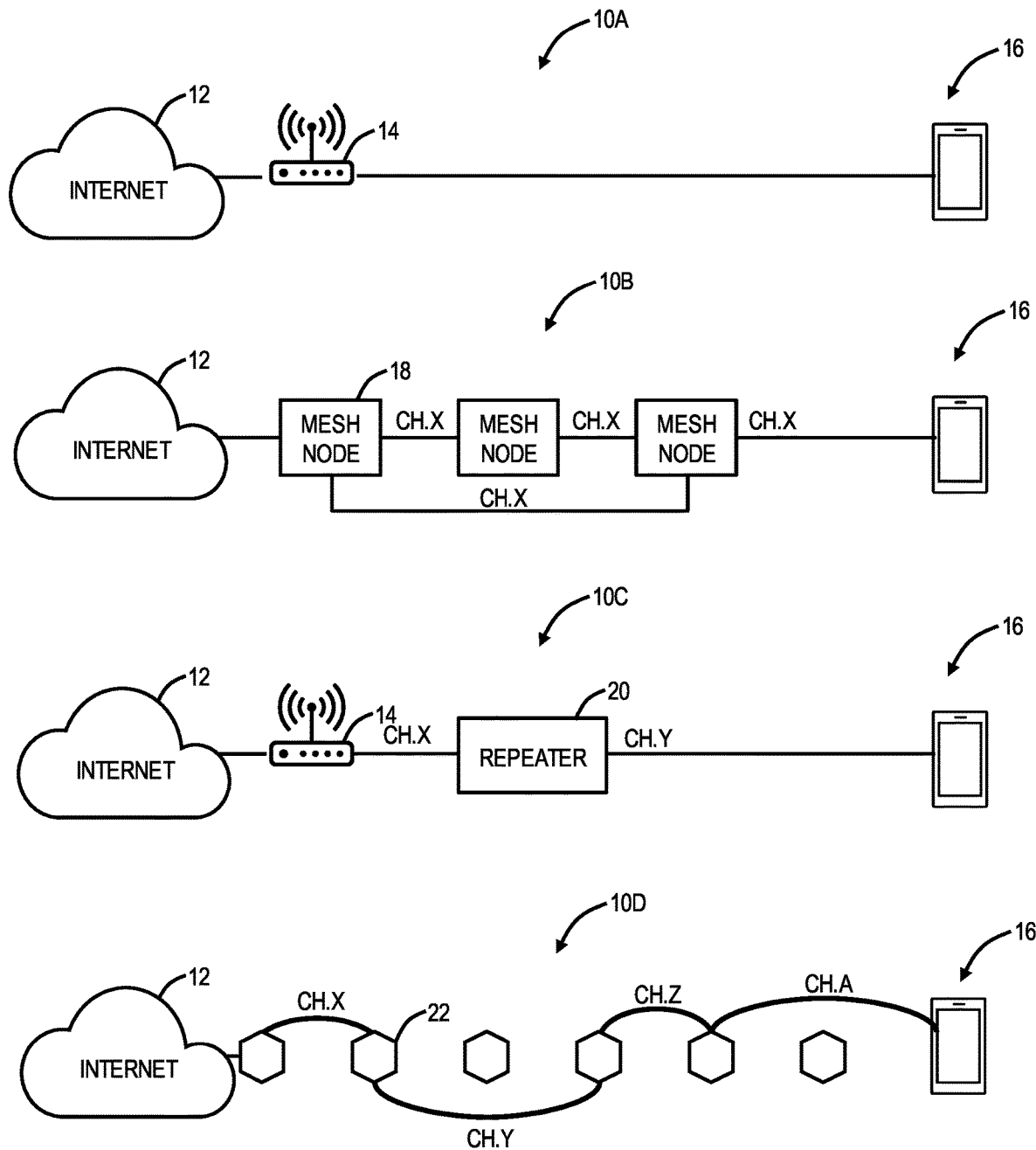
FIG. 1 is a network diagram of various Wi-Fi network topologies for connectivity to the Internet.

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2:
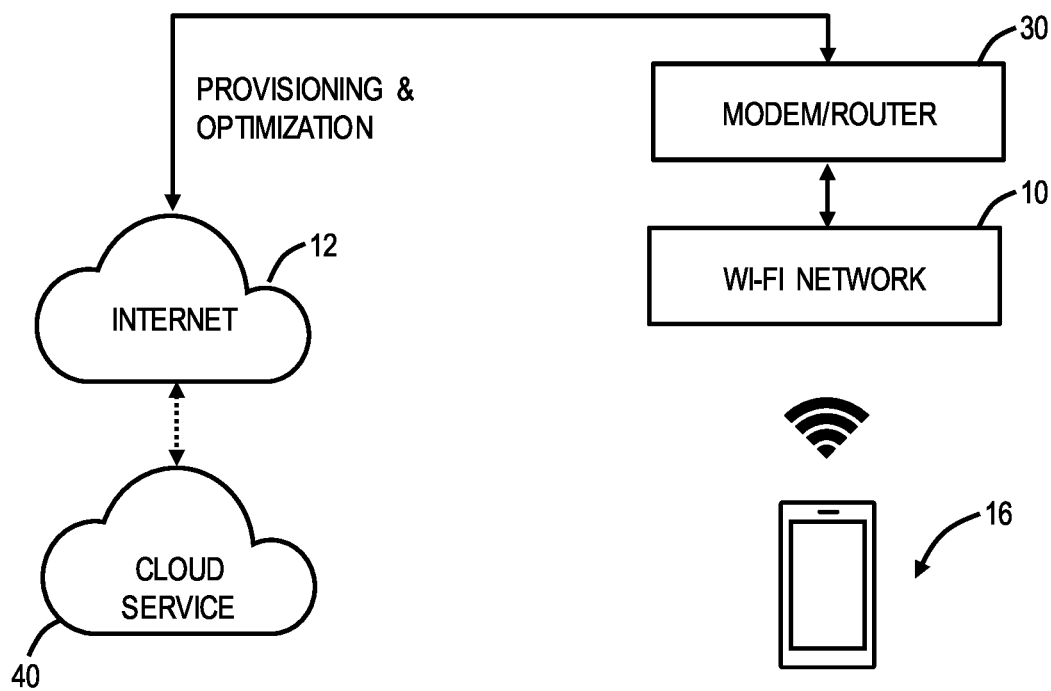
FIG. 2 is a network diagram of the Wi-Fi network with cloud-based control.

FIG. 2 is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modem home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common short hand for a provided cloud computing service (or even an aggregation of all existing cloud services) is "the cloud."

§ 2.0 ACCESS POINT

Figure 3A:
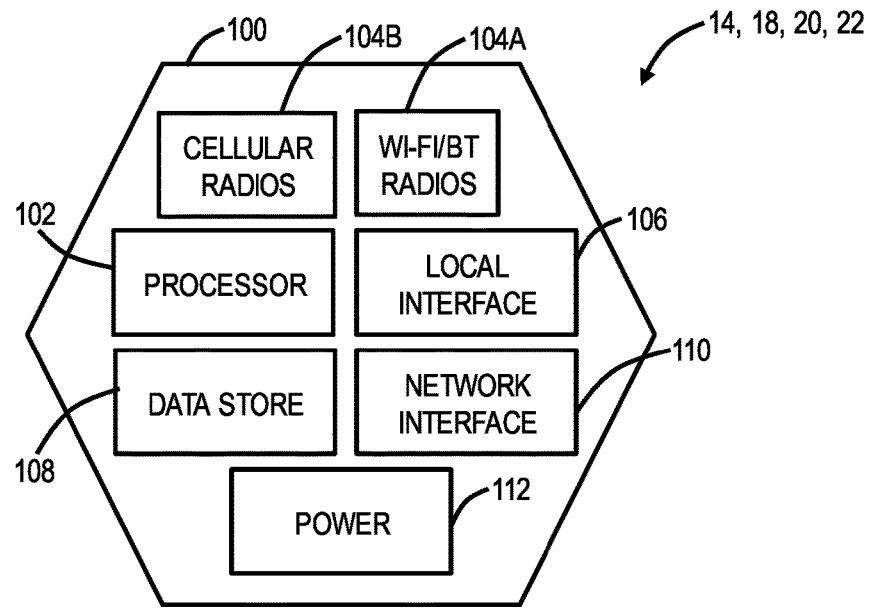
FIG. 3A is a block diagram of functional components of the access points, mesh nodes, repeaters, etc., in the Wi-Fi networks of FIG. 1.
Figure 3B:
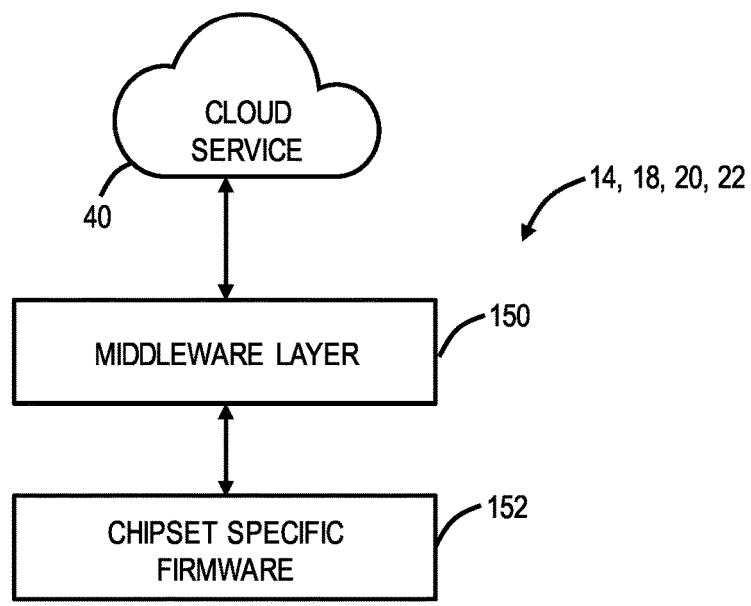
FIG. 3B is a logical diagram of the access points, mesh nodes, repeaters, etc. with a middleware layer to enable operation with the cloud service.

FIG. 3A is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3A depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104B can operate according to the IEEE 802.11 standard. The radios 104B support cellular connectivity such as Long-Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104B such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. An example is described in commonly-assigned U.S. patent Ser. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an on boarding process is required to first establish connectivity for a newly turned on node. In an embodiment, the node can also include the local interface 106 allowing connectivity to a Wi-Fi client device 16 for on boarding to the Wi-Fi network 10 such as through an app on the user device 16. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 30. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 2.1 OpenSync

FIG. 38 is a logical diagram of the access points 14, mesh nodes 18, repeaters 20, etc. ("node") with a middleware layer 150 to enable operation with the cloud service 40. Of note, the present disclosure contemplates use with any vendor's hardware for the access points 14, mesh nodes 18, repeaters 20, etc. with the addition of the middleware layer 150 that is configured to operate with chipset specific firmware 152 in the node. In an embodiment, the middleware layer 150 is OpenSync, such as described in www.opensync.io/documentfltion, the contents of which are incorporated by reference. Again, OpenSync is cloud-agnostic open-source software for the delivery, curation, and management of services for the modem home. That is, this provides standardization of the communication between devices and the cloud service 40. OpenSync acts as silicon, Customer Premises Equipment (CPE), and cloud-agnostic connection between the in-home hardware devices and the cloud service 40.

The middleware layer 150 spans across layers from just above the firmware drivers to the cloud connection for the cloud service 40. The middleware layer 150 is software operates with the following device segments:

Measurements/Statistics/Telemetry
  Collecting measurements reported by the low-level drivers
  Compiling and pre-processing the measurements into statistics that are uniform across different devices
  Presenting the statistics using standardized formats
  Preparing the formatted statistics for transfer to the cloud using serialization and packetizing
  Communicating the statistics to the cloud using standardized and efficient telemetry
Management/Control
  Defining a standard interface for control messaging from the cloud service 40
  Providing operations necessary to manage the services, such as onboarding and provisioning
  Providing rules-based networking configurations to block, filter, forward, and prioritize the messages
  Implementing software to manage the device maintenance functions, including logging, firmware upgrades, and debugging Cloud-Managed Services
  Wi-Fi, including mesh networks that dynamically adapt to their environments
  User access management
  Cybersecurity
  Parental controls
  IoT device management
  Additional services Through use of the middleware layer 150, it is possible to have various different vendor devices operate with the cloud service 40.

§ 2.2 Virtual Network Functions (VNF) on the Access Points

In addition to the middleware layer 150, the present disclosure contemplates the ability for the cloud service 40 to add applications, features, etc. on the nodes. In the present disclosure, the node is configured to maintain tunnels to the corporate network as well as support forwarding based on virtual networks.

§ 2.3 SDN and OpenFlow

In an embodiment, the cloud service 40 can use software defined network (SDN) such as via OpenFlow to control the Wi-Fi networks 10 and the corresponding access points. OpenFlow is described at opennetworking.org and is a communications protocol that gives access to the forwarding plane of a network switch or router over the network. In this case, the forwarding plane is with the access points and the network is the Wi-Fi network 10. The access points and the cloud service can include with Open Flow interfaces and Open vSwitch Database Management Protocol (OVSDB) interfaces. The cloud service 40 can use a transaction oriented reliable communication protocol such as Open vSwitch Database Management Protocol (OVSDB) to interact with the Wi-Fi networks 10.

The present disclosure includes multiple virtual networks in the Wi-Fi network 10 and one implementation can include SDN such as via OpenFlow.

§ 3.0 CLOUD SERVER AND USER DEVICE

Figure 4:
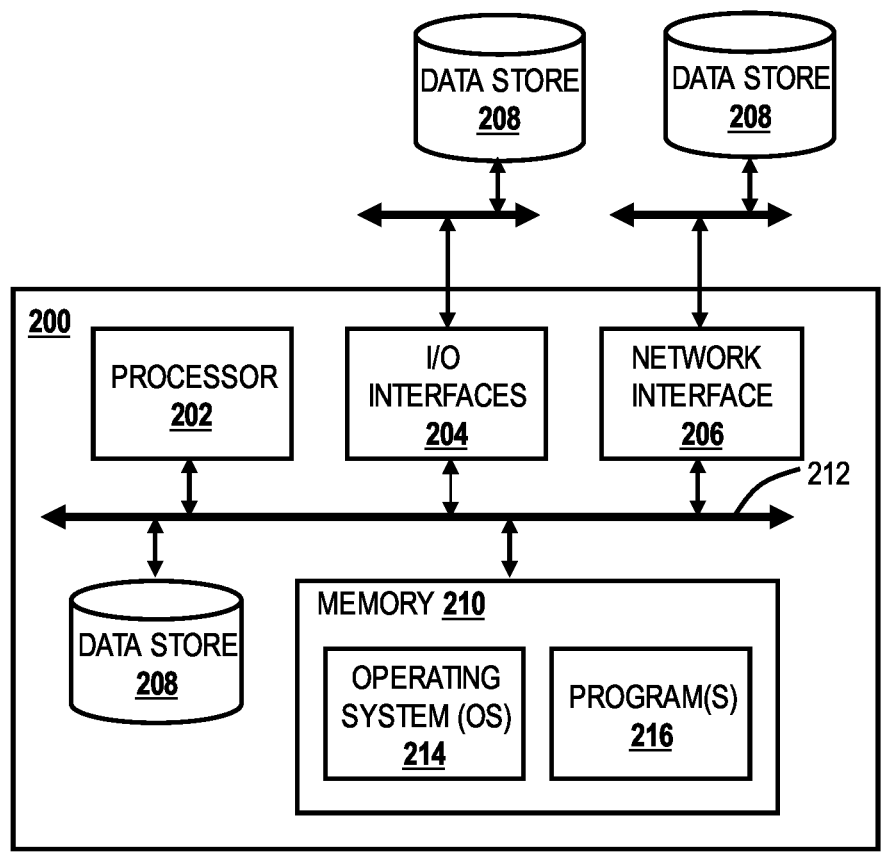
FIG. 4 is a block diagram of functional components of a server, a Wi-Fi client device, or a user device that may be used with the Wi-Fi network of FIG. 1 and/or the cloud-based control of FIG. 2.

FIG. 4 is a block diagram of functional components of a server 200, a Wi-Fi client device 16, or a user device that may be used with the Wi-Fi network of FIG. 1 or 2B, and/or the cloud-based control of FIG. 2. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, InfiniBand, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

§ 4.0 WI-FI NETWORK WITH WIRED AND WIRELESS CONNECTIVITY

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 5:
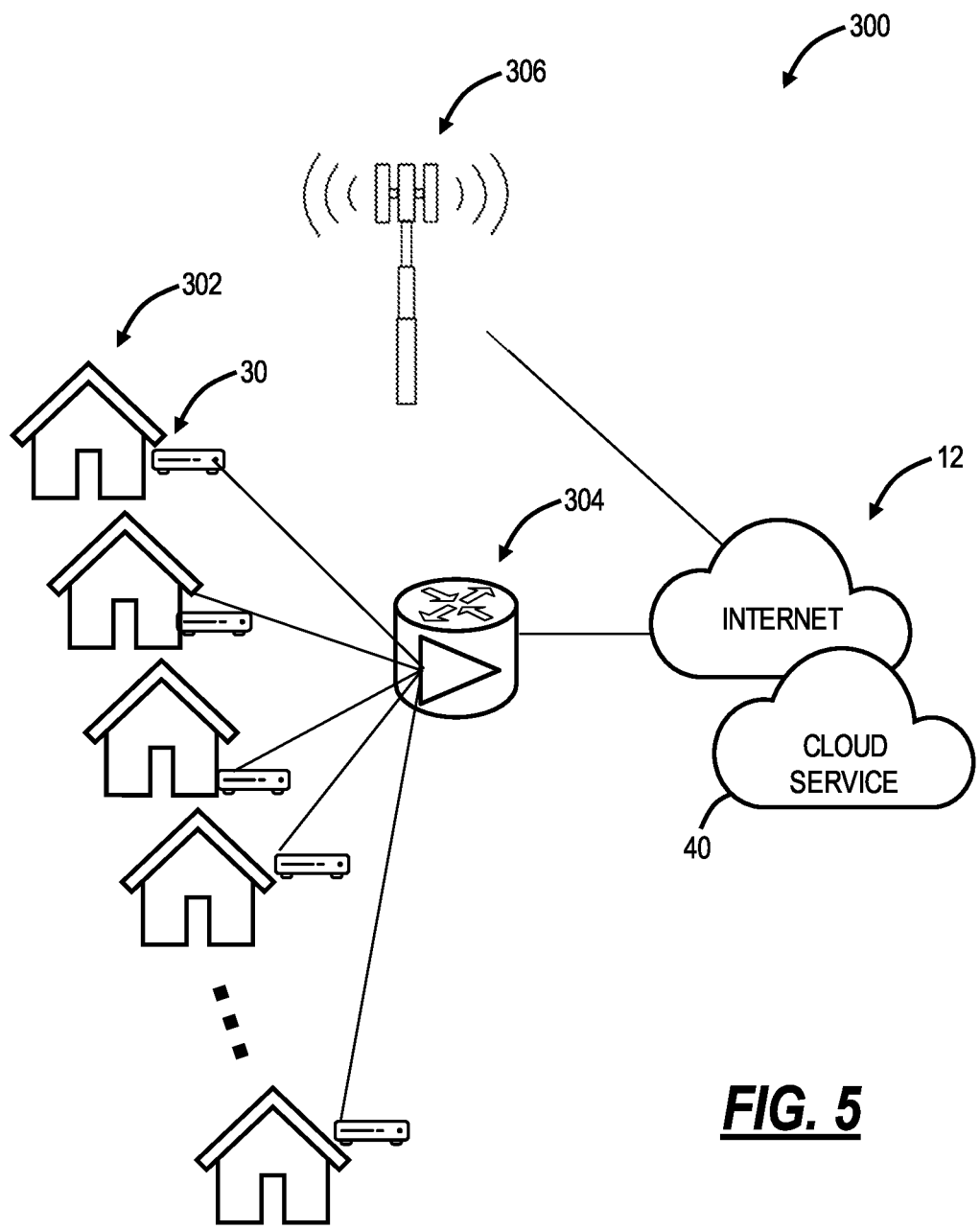
FIG. 5 is a network diagram of a portion of a network associated with a network operator.

FIG. 5 is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically puta burden on the base station 306 or other cellular cells in the area, leading to degradation of services for all mobile users in the area. That is, wired broadband outages tend to be localized and using wireless broadband for failover could inundate the cellular network.

§ 4.1 Fixed Wireless Access System

Figure 6:
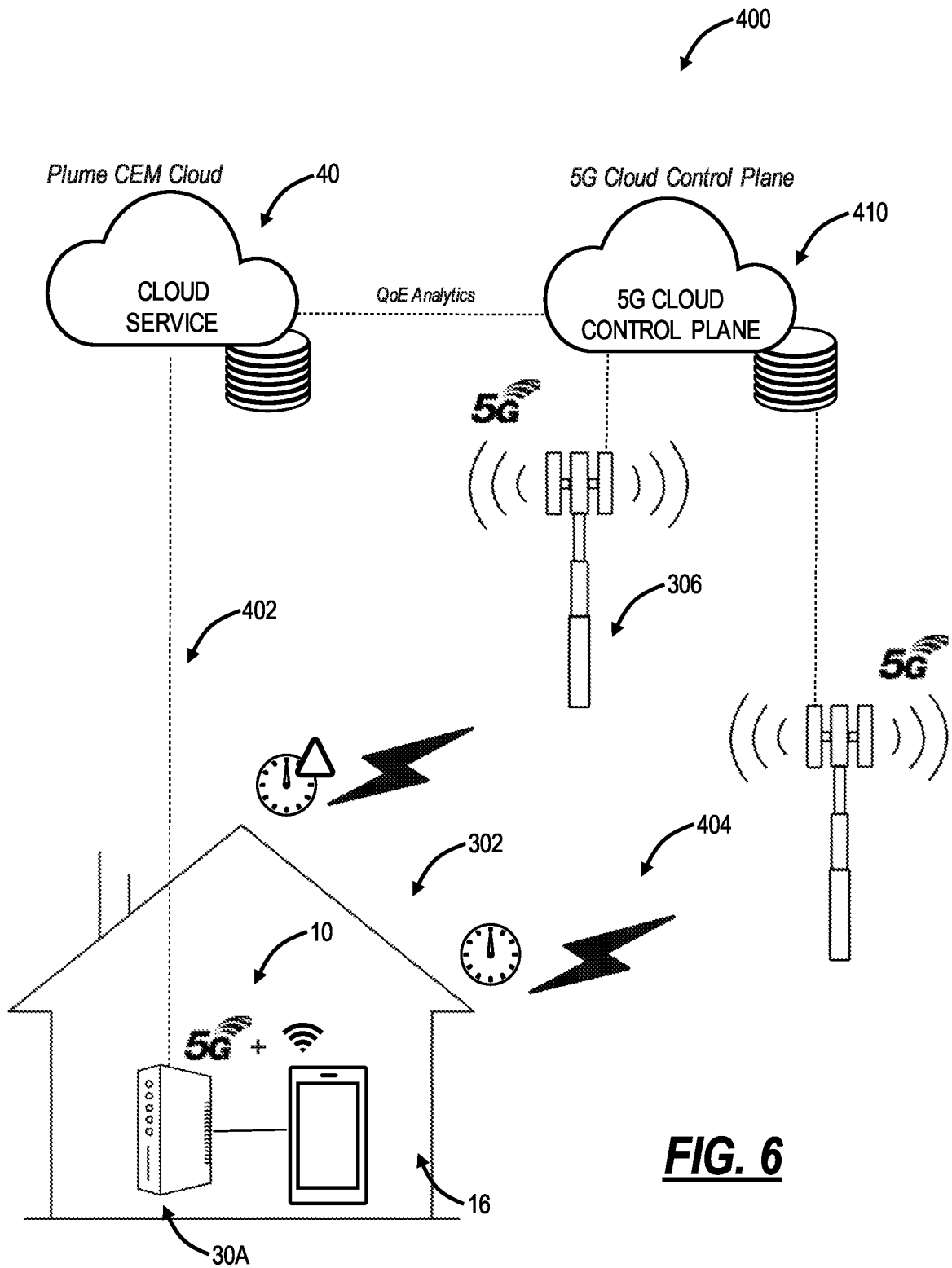
FIG. 6 is a diagram of a fixed wireless access system for wired and/or wireless connectivity.

FIG. 6 is a diagram of a fixed wireless access system 400 for wired and/or wireless connectivity. For illustration purposes, the fixed wireless access system 400 is illustrated with a single home 302 having a modem/router 30 and a Wi-Fi client device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 5.0 IPV6 FROM CSPS

As described herein, Communication Service Providers (CSPs) can be any service provider such as cable provider, wireless provider, etc. IPv4 addresses are fast running out. More and more CSPs are providing only public IPv6 addresses per consumer's home. The present disclosure focuses on such a scenario where a router, gateway, user device only has a public IPv6 address.

These consumers then access IPv4 internet servers using various methods that deliver IPv4 packets using the CSP's IPv6 network. The packets are routed to a Border Router on the CSP's network (using IPv6). That Border Router then extracts that IPv4 packet, and sends it on to the IPv4 internet server. This allows multiple locations to share a single public IPv4 address, held by the Border Router. Examples include Mapping of Address and Port with Encapsulation (MAP-E) and Mapping Address and Port using Translation (MAP-T). MAP-E is an IPv6 transition mechanism for transporting IPv4 packets across an IPv6 network using IP encapsulation, lets ISPs provide IPv4 services without deploying a full dual-stack network. MAP-E saves money on network upgrades and speeds the migration to IPv6, and MAP-E is described in RFC 7597, "Mapping of Address and Port with Encapsulation (MAP-E)," July 2015, the contents of which are incorporated by reference in their entirety. MAP-T is an IPv6 transition solution for ISPs with IPv6 infrastructure to connect their IPv4 subscribers to the IPv4 internet. MAP-T is built on stateless IPv4 and IPv6 address translation technologies, and is described in RFC 7599, "Mapping of Address and Port using Translation (MAP-T)," July 2015, the contents of which are incorporated by reference in their entirety.

§ 6.0 IPV4-IN-IPV6 RELAYING—NETWORK EXAMPLE

FIGS. 7A and 7B are network diagrams of a network 500 for illustrating IPv4-in-IPv6 relaying. The network 500 includes a modem/router 30 that can provide a Local Area Network (LAN) 502 in a location, e.g., home, and the LAN can include Wi-Fi, via any of the access points described herein. A client device 16 can communicate to the Internet 12 via the LAN 502. The modem/router 30 is configured to communicate on a CSP's network via Wide Area Network (WAN) interfaces 504. In this example, there are two WAN interfaces 504, a primary Ethernet interface 506, and a secondary LTE interface 508. The primary Ethernet interface 506 connects to a primary IP address 510 in the CSP network, and the secondary LTE interface 508 connects to a secondary IP address 512 in the CSP network. Note, there can be various nodes, devices, etc. which are omitted for illustration purposes.

There is a connection 520 formed between the primary Ethernet interface 506 and the primary IP address 510. There is another connection 522 formed between the secondary LTE interface 508 and the secondary IP address 512. Note, the connections 520, 522 are on different networks. Also, the connections 520, 522 are tunnels. Conventionally, the WAN interfaces for the two connections 520, 522 have different IP addresses, i.e., public addresses. The problem here is whenever the client device 16 has Transmission Control Protocol (TCP) sessions, such as to a server 530 on the Internet 12, and when the modem/router 30 switches between the connections 520, 522, there is a switch between the WAN interfaces, causing a problem with the TCP sessions, degraded experience, etc.

To solve this problem, the present disclosure provides a same public IP address 540 for both the connections 520, 522. In an embodiment, the public IP address 540 is on a border router 550 (FIG. 7A). In another embodiment, the public IP address 540 is on an edge router 560 (FIG. 7B) that connects to two different border routers 550A, 550B. The border routers 550 are accessible to the modem/router 30 via the connections 520, 522.

The connections 520, 522 utilize IPv4/IPv6 in IPv4/IPv6 encapsulation. Of note, the public IP address 540 can be an IPv4 address that is shared by both of the connections 520, 522 based on the encapsulation. In this manner, a CSP can preserve valuable IPv4 addresses. Also, the two different connections 520, 522 both share the same public IP address 540. The result is that when the modem/router 30 switches between its WAN interfaces for the connections 520, 522, the TCP sessions maintained by the client device 16 will not suffer any disruption and will not have to be restarted, avoiding the typical degraded experience when WAN interfaces are switched.

The primary Ethernet interface 506 and the primary IP address 510 can be either IPv6 or IPv4. There secondary LTE interface 508 and the secondary IP address 512 can be either IPv6 or IPv4. Also, the connection 520 can use IPv4, and the connection 522 can use IPv6, or vice versa.

In an example, assume the networks associated with each of the connections 520, 522 implement IPv4-in-IPv6 encapsulation.

A) The border router 550 (or the edge router 560) can have IPv6 addresses on both the WAN networks (Wired and Cellular).

B) The modem/router 30 can implement the IPv4-in-IPv6 encapsulation, thereby delivering IPv4 packets to the border router 550.

C) The border router 550 (or the edge router 560) still maintains a single IPv4 address 540 to the public Internet 12.

Also, while described here with two WAN interfaces (the connections 520, 522), this approach can apply to more than two interfaces.

The approach can be further expanded for the "router" functionality be distributed. For example, a phone may act as a router when connecting to the cellular network, but as a client device when connections over Wi-Fi. In such a case, making sure that the Wi-Fi router's IPv4-in-IPv6 logic points to the same border router 550 as the phone's Cellular interface does, results in the same benefit to the end user.

§ 6.1 Encapsulation

IPv4 over IPv6 tunneling adds an IPv6 header to IPv4 packets so that the IPv4 packets can pass an IPv6 network through the connections 520, 522. The following describes an example operation in the network 500.

Upon receiving an IPv4 packet from the client device 16, the modem/router 30 delivers it to the IPv4 protocol stack.

The IPv4 protocol stack uses the destination address of the packet (assume it is the DA of the server 530, e.g., 93.103.18.77) to determine the egress interface. Here the egress interface is the tunnel interface, the IPv4 protocol stack delivers the packet to a tunnel interface.

The tunnel interface adds an IPv6 header to the original IPv4 packet and delivers the packet to the IPv6 protocol stack.

The IPv6 protocol stack uses the destination IPv6 address of the packet (e.g., the IP address of the primary IP 510 or the secondary IP 512) to look up the routing table, and then sends it out.

At the border router 550, the IPv4 packet is taken and the public IP address 540 of the border router 550 is used as the source address of the IPv4 packet.

§ 6.2 Process

Figure 8:
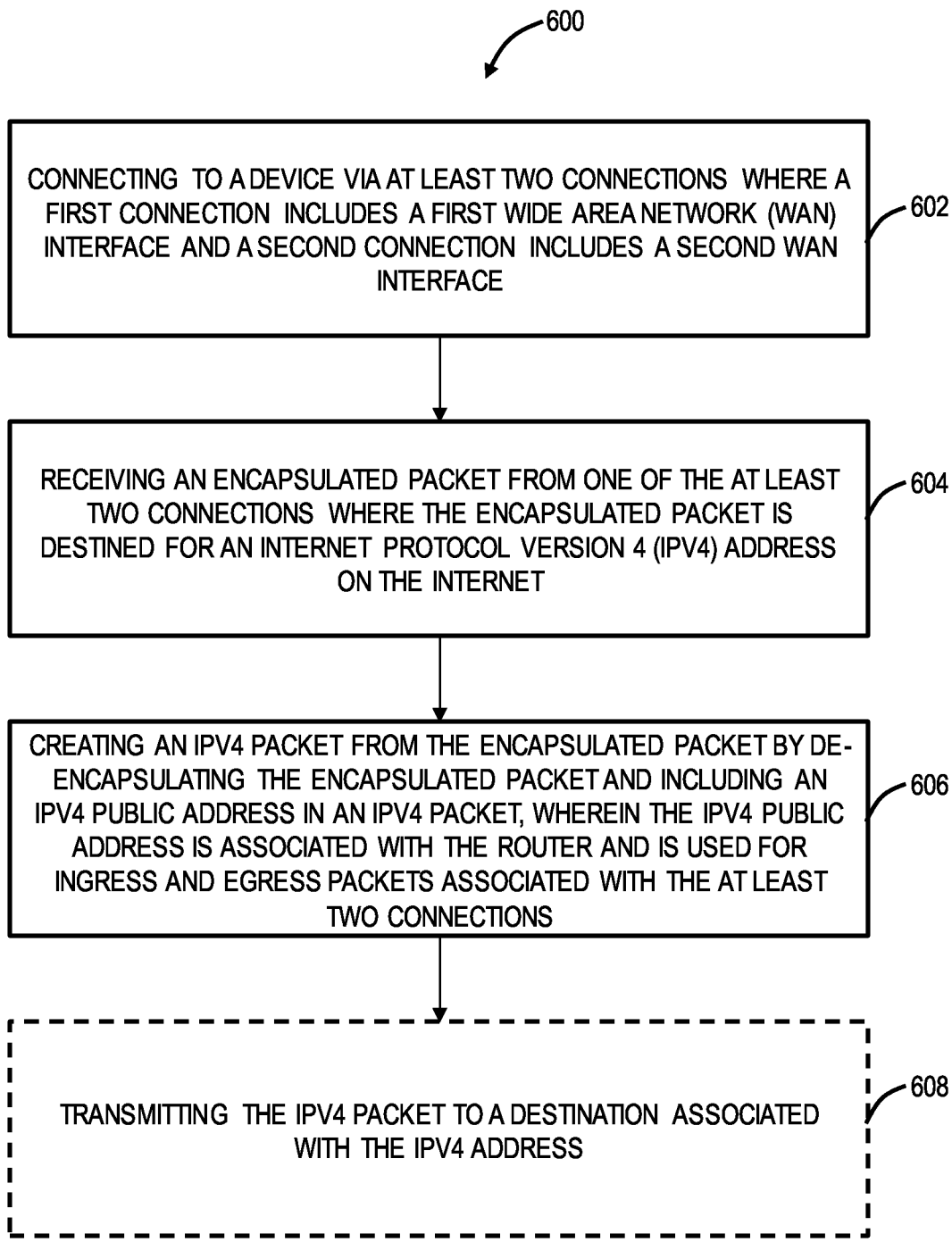
FIG. 8 is a flowchart of a process for Internet Protocol (IP) version 4 (IPv4)-in-IP version 6 (IPv6) relaying to preserve IPv4 public addresses.

FIG. 8 is a flowchart of a process 600 for Internet Protocol (IP) version 4 (IPv4)-in-IP version 6 (IPv6) relaying to preserve IPv4 public addresses. The process 600 contemplates implementation in a router in a Communication Service Provider (CSP) network, e.g., the Border Router 550, the edge router 560, etc.

The process 600 includes connecting to a device via at least two connections where a first connection includes a first Wide Area Network (WAN) interface and a second connection includes a second WAN interface (step 602); receiving an encapsulated packet from one of the at least two connections where the encapsulated packet is destined for an Internet Protocol version 4 (IPv4) address on the Internet (step 604); and creating an IPv4 packet from the encapsulated packet by de-encapsulating the encapsulated packet and including an IPv4 public address in an IPv4 packet, wherein the IPv4 public address is associated with the router and is used for ingress and egress packets associated with the at least two connections (step 606). The process 600 can further include transmitting the IPv4 packet to a destination associated with the IPv4 address (step 608).

The router can include a first address for a port for the first WAN interface and a second address for a port for the second WAN interface. The process 600 can further include performing Network Address Translation between the IPv4 public address and the first address or the second address, depending on which of the first and second WAN interface is active. The first address and the second address can be Internet Protocol version 6 (IPv6) addresses. The encapsulated packet can be encapsulated using IPv4 over Internet Protocol version 6 (IPv6) tunneling.

The process 600 can further include, responsive to a switch between the first WAN interface and the second WAN interface, receive a second encapsulated packet on a different interface from the first packet. The first encapsulated packet and the second encapsulated packet can be associated with a Transmission Control Protocol (TCP) session at the device, such that the switch does not affect the TCP session.

The device can be a modem/router at a user's home, and where the first WAN interface is a wired interface and the second WAN interface is a wireless interface. The device can be a user device, and where the first WAN interface is a Wi-Fi interface and the second WAN interface is a cellular interface.

The router can be a Border Router. The Border Router can implement one of Mapping of Address and Port with Encapsulation (MAP-E) and Mapping Address and Port using Translation (MAP-T). The router can be an edge router communicatively coupled to two Border Routers, each of the two Border Routers configured to terminate one of the at least two connections.

§ 6.3 Router

Figure 9:
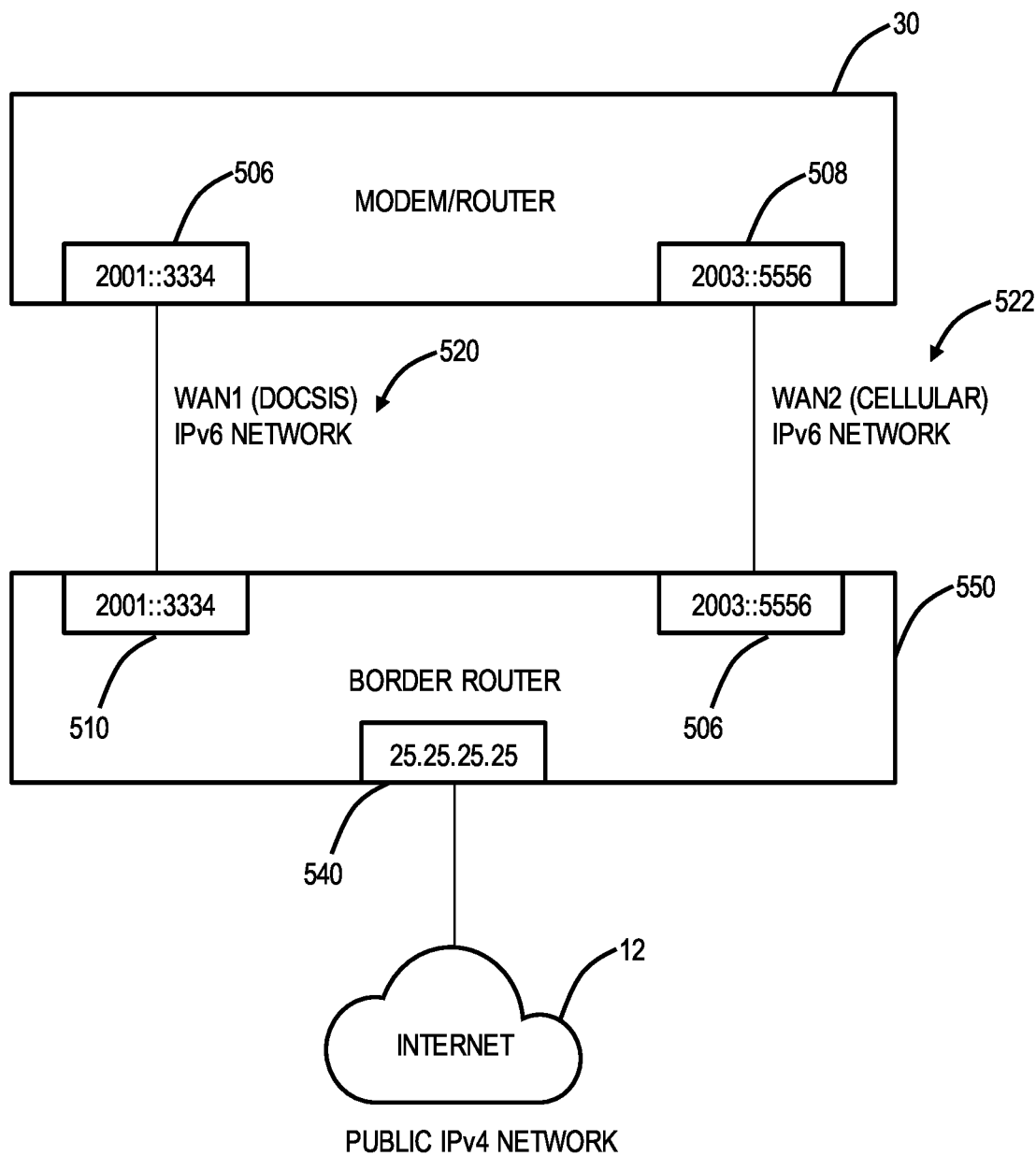
FIG. 9 is a network diagram of interconnections between the modem/router and the Border Router, such as in FIG. 7A.

FIG. 9 is a network diagram of interconnections between the modem/router 30 and the Border Router 550, such as in FIG. 7A. This example in FIG. 9 omits various intermediate devices, for illustrating the aspect that the Border Router has two IPv6 addresses 506, 510, as well as a single public IPv4 address 540, connected to the modem/router 30. The Border Router 550 (or the edge router 560 in combination with the Border Routers 550A, 550B) is configured to encapsulate packets destined for the modem/router 30 and to de-encapsulate packets from the modem/router 30 destined for the Internet 12, or any other public IPv4 network. In this manner, the CSP can provide a single IPv4 address for multiple users, and utilize IPv6 within their network, i.e., the connections 520, 522.

The router is a network element or device in a network that is configured to route/forward packets in a network. A router is connected to two or more data lines from different IP networks. When a data packet comes in on one of the lines, the router reads the network address information in the packet header to determine the ultimate destination. Then, using information in its routing table or routing policy, it directs the packet to the next network on its journey.

Routers can be built from standard computer parts but are mostly specialized, purpose-built computers. A simple or cheap router uses almost entirely software-based forwarding, running on its CPU. More sophisticated devices may increasingly contain special hardware including ASICs, FPGAs and TCAM to increase performance or add advanced filtering and security functions, crossing over to firewalls. Further, the router can be a virtualized device, e.g., Virtual Network Function (VNF). The present disclosure contemplates any implementation of a router for the Border Routers 550, 550A, 550B, the edge router 560, and the modem/router 30. For example, the Border Routers 550, 550A, 550B and the edge router 560 can be large, carrier-grade devices used in the CSP network. The modem/router 30 can be a home or small office device, such as a Wi-Fi gateway, etc.

§ 7.0 CONCLUSION

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and option ally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented in a router in a Communication Service Provider (CSP) network, comprising steps of:
   connecting to a device via at least two connections where a first connection includes a first Wide Area Network (WAN) interface and a second connection includes a second WAN interface;
   receiving an encapsulated packet from one of the at least two connections where the encapsulated packet is destined for an Internet Protocol version 4 (IPv4) address on the Internet; and
   creating an IPv4 packet from the encapsulated packet by de-encapsulating the encapsulated packet and including an IPv4 public address in an IPv4 packet, wherein the IPv4 public address is associated with the router and is used for ingress and egress packets associated with the at least two connections.

2. The method of claim 1, wherein the steps further include:
   transmitting the IPv4 packet to a destination associated with the IPv4 address.

3. The method of claim 1, wherein the router includes a first address for a port for the first WAN interface and a second address for a port for the second WAN interface.

4. The method of claim 3, wherein the steps further include:
   performing Network Address Translation between the IPv4 public address and the first address or the second address, depending on which of the first and second WAN interface is active.

5. The method of claim 3, wherein the first address and the second address are Internet Protocol version 6 (IPv6) addresses.

6. The method of claim 3, wherein the encapsulated packet is encapsulated using IPv4 over Internet Protocol version 6 (IPv6) tunneling.

7. The method of claim 1, wherein the steps further include:
   responsive to a switch between the first WAN interface and the second WAN interface, receive a second encapsulated packet on a different interface from the first packet.

8. The method of claim 7, wherein the first encapsulated packet and the second encapsulated packet are associated with a Transmission Control Protocol (TCP) session at the device, such that the switch does not affect the TCP session.

9. The method of claim 1, wherein the device is a modem/router at a user's home, and where the first WAN interface is a wired interface and the second WAN interface is a wireless interface.

10. The method of claim 1, wherein the device is a user device, and where the first WAN interface is a Wi-Fi interface and the second WAN interface is a cellular interface.

11. The method of claim 1, wherein the router is a Border Router.

12. The method of claim 11, wherein the Border Router implements one of Mapping of Address and Port with Encapsulation (MAP-E) and Mapping Address and Port using Translation (MAP-T).

13. The method of claim 1, wherein the router is an edge router communicatively coupled to two Border Routers, each of the two Border Routers configured to terminate one of the at least two connections.

14. A router in a Communication Service Provider (CSP) network, wherein the router comprises circuitry configured to:
   connect to a device via at least two connections where a first connection includes a first Wide Area Network (WAN) interface and a second connection includes a second WAN interface;
   receive an encapsulated packet from one of the at least two connections where the encapsulated packet is destined for an Internet Protocol version 4 (IPv4) address on the Internet; and
   create an IPv4 packet from the encapsulated packet by de-encapsulating the encapsulated packet and including an IPv4 public address in an IPv4 packet, wherein the IPv4 public address is associated with the router and is used for ingress and egress packets associated with the at least two connections.

15. The router of claim 14, wherein the circuitry is further configured to:
   transmit the IPv4 packet to a destination associated with the IPv4 address.

16. The router of claim 14, wherein the router includes a first address for a port for the first WAN interface and a second address for a port for the second WAN interface.

17. The router of claim 14, wherein the circuitry is further configured to:
- responsive to a switch between the first WAN interface and the second WAN interface, receive a second encapsulated packet on a different interface from the first packet.

18. The router of claim 14, wherein the device is one of
- a modem/router at a user's home, and where the first WAN interface is a wired interface and the second WAN interface is a wireless interface; and
- a user device, and where the first WAN interface is a Wi-Fi interface and the second WAN interface is a cellular interface.

19. The router of claim 14, wherein the router is one of (1) a Border Router, and (2) an edge router communicatively coupled to two Border Routers, each of the two Border Routers configured to terminate one of the at least two connections.

20. A non-transitory computer-readable medium comprising instructions that, when executed, cause a router in a Communication Service Provider (CSP) network to perform steps of:
- connecting to a device via at least two connections where a first connection includes a first Wide Area Network (WAN) interface and a second connection includes a second WAN interface;
- receiving an encapsulated packet from one of the at least two connections where the encapsulated packet is destined for an Internet Protocol version 4 (IPv4) address on the Internet; and
- creating an IPv4 packet from the encapsulated packet by de-encapsulating the encapsulated packet and including an IPv4 public address in an IPv4 packet, wherein the IPv4 public address is associated with the router.

\* \* \* \* \*